(12) United States Patent
Lingras et al.

(10) Patent No.: US 11,288,757 B2
(45) Date of Patent: Mar. 29, 2022

(54) METHOD AND SYSTEM FOR GENERATING A BUILDING ENERGY MODEL FOR A CLIENT BUILDING

(71) Applicant: GREEN POWER LABS INC., Dartmouth (CA)

(72) Inventors: Pawan Lingras, Bedford (CA); Alexandre Pavlovski, Bedford (CA); Ilia Pavlovski, Bedford (CA); Aaron Caldwell, Portuguese Cove (CA); Trent Hilliard, Halifax (CA); Zheng Qin, Dartmouth (CA)

(73) Assignee: GREEN POWER LABS INC., Dartmouth (CA)

( * ) Notice: Subject to any disclaimer, the term of this patent is extended or adjusted under 35 U.S.C. 154(b) by 267 days.

(21) Appl. No.: 16/618,279

(22) PCT Filed: May 30, 2018

(86) PCT No.: PCT/CA2018/000107
§ 371 (c)(1),
(2) Date: Nov. 29, 2019

(87) PCT Pub. No.: WO2018/218334
PCT Pub. Date: Dec. 6, 2018

(65) Prior Publication Data
US 2020/0151836 A1 May 14, 2020

Related U.S. Application Data

(60) Provisional application No. 62/513,408, filed on May 31, 2017.

(51) Int. Cl.
*G06Q 50/16* (2012.01)
*G05B 13/02* (2006.01)
(Continued)

(52) U.S. Cl.
CPC ....... *G06Q 50/163* (2013.01); *G05B 13/0265* (2013.01); *G06N 5/02* (2013.01); *G06Q 10/06* (2013.01); *G06Q 50/06* (2013.01)

(58) Field of Classification Search
None
See application file for complete search history.

(56) References Cited

U.S. PATENT DOCUMENTS 7,881,889 B2 2/2011 Barclay et al.
2012/0065789 A1 3/2012 Scelzi et al.
(Continued)

OTHER PUBLICATIONS

International Searching Authority (ISA/CA), International Search Report and Written Opinion, dated Sep. 5, 2018, for corresponding International Patent Application No. PCT/CA2018/000107.
(Continued)

*Primary Examiner* — Mohammad Ali
*Assistant Examiner* — Saad M Kabir
(74) *Attorney, Agent, or Firm* — Conneely PC; Joseph Conneely

(57) ABSTRACT

A method for generating an AI-based building energy model for a client building, comprising: generating an energy profile database by: defining a set of building parameters; generating energy profiles by simulating a set of physical building models; and, populating the energy profile database with the energy profiles; determining an energy profile for the client building by: splitting the energy profile database into groups and clustering each group into a set of clusters; selecting a cluster; and, selecting the energy profile in the cluster that is a closest match to that of the client building; selecting a physical building model from a building model database that corresponds to the energy profile; calibrating the physical building model to generate an adjusted building model; and, generating a set of training datasets from the
(Continued)

adjusted building model and inputting the set of training datasets into an AI module to generate the AI-based model.

15 Claims, 10 Drawing Sheets

(51) Int. Cl.
*G06N 5/02* (2006.01)
*G06Q 10/06* (2012.01)
*G06Q 50/06* (2012.01)

(56) References Cited

U.S. PATENT DOCUMENTS

| | | |
|---|---|---|
| 2014/0303796 A1 | 10/2014 | Jeong et al. |
| 2016/0305678 A1 | 10/2016 | Pavlovski et al. |
| 2017/0061444 A1 | 3/2017 | Wall et al. |

OTHER PUBLICATIONS

Zhao et al., "A Review on the Prediction of Building Energy Consumption", Renewable and Sustainable Energy Reviews, vol. 16, Issue 6, Aug. 2012, pp. 3586-3592.

Wang et al., "A Review of Artificial Intelligence Based Building Energy Prediction with a Focus on Ensemble Prediction Models", Proceedings of the 2015 Winter Simulation Conference (WSC), Huntington Beach, CA, 2015, pp. 3438-3448.

Wikipedia, "List of Building Types", Available at https://en.wikipedia.org/wiki/List_of_building_types, Site Visited Feb. 25, 2020.

Office Of Energy Efficiency & Renewable Energy, "Commerical Reference Buildings", Available at https://www.energy.gov/eere/buildings/commercial-reference-buildings, Site visited Feb. 25, 2020.

METHOD AND SYSTEM FOR GENERATING A BUILDING ENERGY MODEL FOR A CLIENT BUILDING

This application claims priority from and the benefit of the filing date of U.S. Provisional Patent Application No. 62/513,408, filed May 31, 2017, and the entire content of such application is incorporated herein by reference, and is a national phase entry of International Patent Application No. PCT/CA2018/000107, filed May 30, 2018, and the entire content of such application is incorporated herein by reference.

FIELD OF THE APPLICATION

This application relates to the field of building energy modeling and control systems, and more specifically, to a method and system for generating a building energy model for a client building.

BACKGROUND OF THE APPLICATION

Commercial, residential, and industrial buildings are responsible for a significant portion of the world's total energy use. Heating and cooling account for most of a building's energy consumption and typically are the most expensive items with respect to building energy costs as electrical power for heating and cooling is often purchased at peak rates. While the cost of heating and cooling buildings is increasing, the thermal comfort of building occupants remains an important concern as such comfort supports occupants' productivity, health, and is related to optimal operating conditions for buildings whether they be residential, commercial, or industrial.

The operating conditions and related energy use in a building are typically managed by a building automation system ("BAS") and related building energy management system ("BEMS"). The building energy management system controls all heating, ventilating and air conditioning ("HVAC") devices in the building to keep thermal and air quality operating conditions in each individual zone, area, or room of the building within a desired range. The thermal parameters controlled by the building energy management system include, but are not limited to, thermal zone temperature, relative humidity, and air quality. To maintain these thermal parameters within required ranges and optimize energy usage, BEMS/BAS systems typically require real-time, artificial intelligence ("AI") based building energy modeling.

AI-based building energy models are used to predict the energy use of a building in real-time, and to apply the predicted building energy data in building control. An AI-based building energy model (sometimes called a "predictive response model" as it predicts building response to conditions, uses, sources and gains) has inputs for: ambient weather, building envelope (including physical and functional characteristics of the building), heating, ventilation and air conditioning systems; characteristics, schedules and internal gains of occupants, equipment and lighting; and, utility fuel rates for natural gas, propane, oil, coil, and electricity. The model inputs also include historical end-use categories such as heating, cooling and ventilation, lighting, and processing, as well as historical energy costs, and carbon footprint. The building energy model outputs typically include energy use (in end-use categories), energy costs, and carbon footprint.

While existing BEMS/BAS systems require the above described inputs for real-time energy modeling, detailed information pertaining to building energy data including building envelope, building energy use and weather conditions as well as buildings occupancy is not maintained for most existing buildings. As such, the effort and time needed to perform AI-based building energy modeling based on detailed building energy related data is time consuming.

Several methods and systems for AI-based building energy modeling having databases describing building envelope, weather, occupancy and energy use in commercial, residential, and industrial buildings have been proposed. For example, Hai-Xiang Zhao and Frederic Magoules (Hai-Xiang Zhao and Frederic Magoules, "A Review on the Prediction of Building Energy Consumption", Renewable and Sustainable Energy Reviews, Volume 16, Issue 6, August 2012, Pages 3586-3592, Elsevier, which is incorporated herein by reference) reviewed recently developed models to accurately implement the prediction of building energy consumption, which includes elaborate and simplified engineering methods, statistical methods and artificial intelligence methods. In addition, Zeyu Wang and R. S. Srinivasan (Zeyu Wang and R. S. Srinivasan, "A Review of Artificial Intelligence Based Building Energy Prediction with a Focus on Ensemble Prediction Models", 2015 Winter Simulation Conference (WSC), Huntington Beach, Calif., 2015, pp. 3438-3448, which is incorporated herein by reference) reviewed the principles, applications, advantages, and limitations of AI-based building energy prediction methods.

In addition, United States Patent Application Publication No. 20140303796 by Jeong, et al. (entitled "Apparatus and Method for Controlling Building Energy", published Oct. 9, 2014, and incorporated herein by reference) describes an apparatus for providing a building energy consumption diagnosis and real-time commissioning processing, including a database section configured to store building related information. Furthermore, United States Patent Application Publication No. 20160305678 by Pavlovski, et al. (entitled "Predictive Building Control System and Method for Optimizing Energy Use and Thermal Comfort for a Building or Network of Buildings", published Oct. 20, 2016, and incorporated herein by reference) describes a method for controlling temperature in a thermal zone within a building using AI-based building energy modeling and related building energy data. Finally, United States Patent Application Publication No. 20170061444 by Wall et al., (entitled "Analysis Engine that Correlates Business Operations with Facility Energy Use", published Mar. 2, 2017, and incorporated herein by reference) describes a method to receive data from information technology ("IT") systems of buildings related to input energy use, energy driver, and/or control parameters for equipment at those buildings.

While addressing important areas of building energy data including building envelope, weather, occupancy and energy use, one problem with existing methods and systems is that they do not provide building information having the degree of granularity that is required for modern building energy modeling for real-time operations.

A need therefore exists for an improved method and system for generating a building energy model for a client building. Accordingly, a solution that addresses, at least in part, the above and other shortcomings is desired.

SUMMARY OF THE APPLICATION

According to one aspect of the application, there is provided a method for generating an AI-based building energy model for a client building, comprising: using a processor, generating an energy profile database by: defining a set of building parameters including one or more of building types, climate zone specifications, and building envelope parameters including one or more of window-to-wall ratios, R-values, and U-factors; generating energy profiles by simulating a set of physical building models corresponding to the set of building parameters; and, populating the energy profile database with the energy profiles; determining an energy profile for the client building by: splitting the energy profile database into parameter-based groups and clustering each parameter-based group into a set of clusters, each cluster having a representative pattern, the energy profiles belonging to each cluster being sorted based on their proximity to the representative pattern; selecting a cluster from the set of clusters; and, selecting the energy profile in the cluster that is a closest match to that of the client building using the respective representative pattern for the cluster; selecting a physical building model from a building model database that corresponds to the energy profile for the client building; calibrating the physical building model using known energy data and metadata for the client building to generate an adjusted building model for the client building; and, generating a set of training datasets from the adjusted building model and inputting the set of training datasets into an artificial intelligence module to generate the AI-based building energy model.

In accordance with further aspects of the application, there is provided an apparatus such as a data processing system, a building analytics system, a building energy modeling system, a predictive building control system, a building energy management system, a utility demand response control system, a control system, a controller, a computer system, etc., a method for adapting same, as well as articles of manufacture such as a computer readable medium or product and computer program product or software product (e.g., comprising a non-transitory medium) having program instructions recorded thereon for practising the method of the application.

BRIEF DESCRIPTION OF THE DRAWINGS

Further features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF EXAMPLE EMBODIMENTS

In the following description, details are set forth to provide an understanding of the application. In some instances, certain software, circuits, structures and methods have not been described or shown in detail in order not to obscure the application. The term "data processing system" or "system" is used herein to refer to any machine for processing data, including the building analytics systems, energy profile database and clustering systems, building energy modeling systems, predictive building control systems, building energy management systems, utility demand response control systems, supervisory control and data acquisition ("SCADA") systems, energy management systems ("EMSs"), control systems, controllers, computer systems, and network arrangements described herein. The present application may be implemented in any computer programming language provided that the operating system of the data processing system provides the facilities that may support the requirements of the present application. Any limitations presented would be a result of a particular type of operating system or computer programming language and would not be a limitation of the present application. The present application may also be implemented in hardware or in a combination of hardware and software.

According to one embodiment of the application, there is provided a method and system for building analytics which optimizes dynamic clustering of energy consumption patterns in a building knowledge cloud for real-time, AI-based building energy modeling. According to one embodiment, in terms of clustering of buildings, an individual building is treated as belonging to a cluster determined by core variables including but not limited to building type (e.g., large office, post-1980 construction or secondary school, pre-1980 construction), climate zone specifications, and building envelope parameters such as window-to-wall ratios, R-values, and U-factors. For reference, a "window-to-wall ratio" is a percentage area measure determined by dividing a building's total glazed (i.e., windowed) area by its exterior envelope wall area (i.e., non-glazed area). A "R-value" is a measure of thermal resistance or the ability of heat to transfer from hot to cold through materials (such as insulation) and assemblies of materials (such as walls and floors). A "U-factor" is a measure of a material's or assembly's ability to transfer heat. Also, as used in the present application, in terms of clustering of buildings, an "individual building" may be defined by its occupancy schedule, share of energy uses in heating, cooling and ventilation, and share of energy sources such as natural gas, propane, coal, oil and electricity.

Figure 7:
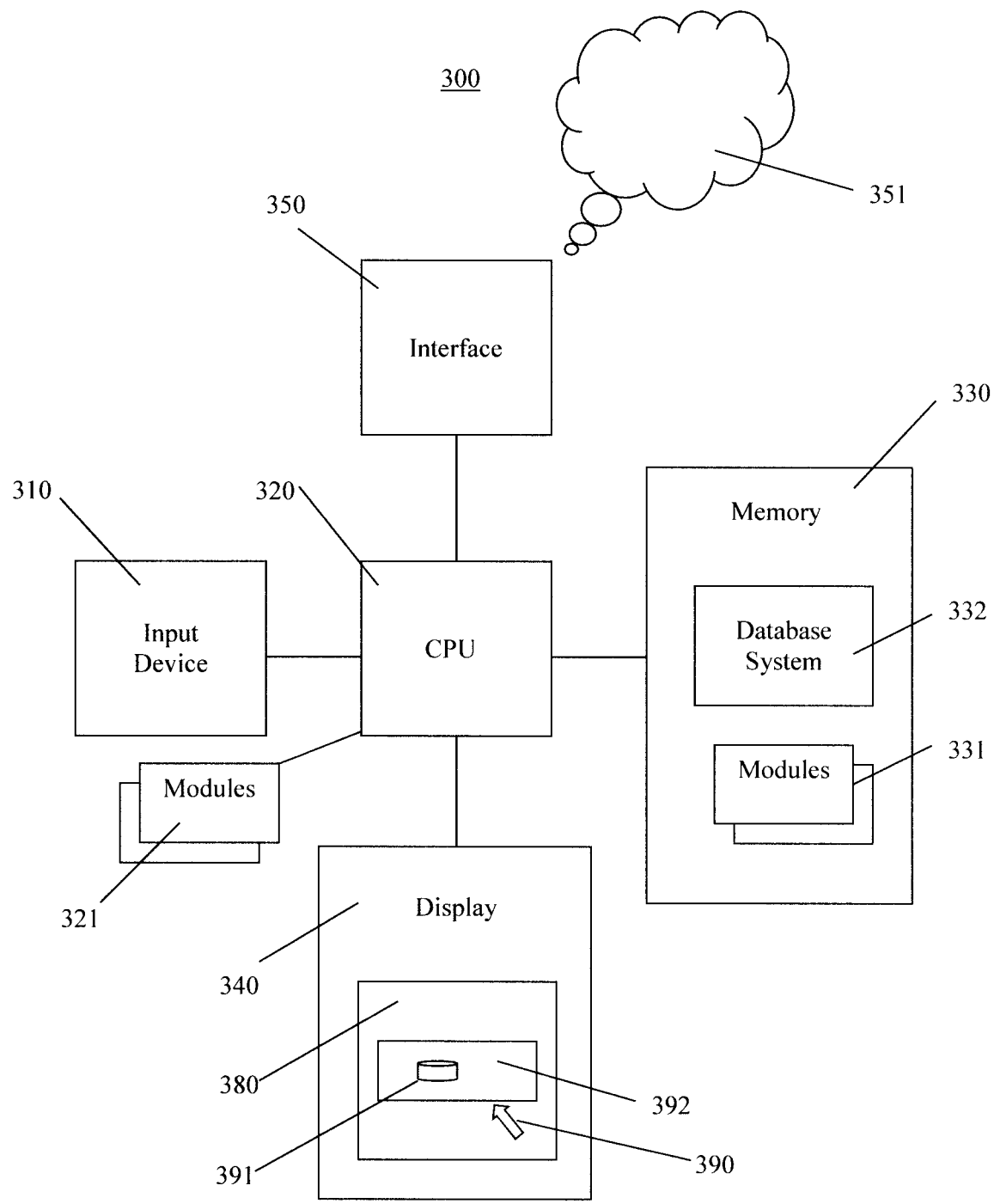
FIG. 7 is a block diagram illustrating a data processing system in accordance with an embodiment of the application; and, FIG. 8 is a flow chart illustrating operations of modules within a data processing system for generating an AI-based building energy model for a client building, in accordance with an embodiment of the application.

FIG. 7 is a block diagram illustrating a data processing system 300 in accordance with an embodiment of the invention. The data processing system 300 is suitable for performing as a building analytics system 3000, an energy profile database and clustering system 4000, a building energy modeling system, a predictive building control system, a building energy management system, a utility demand response control system, a control system, a supervisory control and data acquisition ("SCADA") system, an energy management system ("EMS"), or the like. The data processing system 300 is also suitable for data processing, management, storage, and for generating, displaying, and adjusting presentations in conjunction with a user interface or a graphical user interface ("GUI"), as described below. The data processing system 300 may be a client and/or server in a client/server system. For example, the data processing system 300 may be a server system or a personal computer ("PC") system. The data processing system 300 may also be a distributed system which is deployed across multiple processors. The data processing system 300 may also be a virtual machine. The data processing system 300 includes an input device 310, at least one central processing unit ("CPU") 320, memory 330, a display 340, and an interface device 350. The input device 310 may include a keyboard, a mouse, a trackball, a touch sensitive surface or screen, a position tracking device, an eye tracking device, a camera, a tactile glove or gloves, a gesture control armband, or a similar device. The display 340 may include a computer screen, a television screen, a display screen, a terminal device, a touch sensitive display surface or screen, a hard-copy producing output device such as a printer or plotter, a head-mounted display, virtual reality ("VR") glasses, an augmented reality ("AR") display, a hologram display, or a similar device. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. Thus, the data processing system 300 may be linked to other data processing systems by the network 351. In addition, the interface 351 may include one or more input and output connections or points for connecting various sensors, status (indication) inputs, analog (measured value) inputs, counter inputs, analog outputs, and control outputs to the data processing system 300. In addition, the data processing system 300 may include a Global Positioning System ("GPS") receiver. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands, queries, or data and to the display 340 for displaying the results of these commands, queries, or data to the user. Commands, queries, and data may also be received via the interface device 350 and results and data may be transmitted via the interface device 350. The data processing system 300 may include a data store or database system 332 for storing data and programming information. The database system 332 may include a database management system (e.g., 332) and a database (e.g., 332) and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the application.

Thus, the data processing system 300 includes computer executable programmed instructions for directing the system 300 to implement the embodiments of the present application. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium or product (e.g., one or more digital video disks ("DVDs"), compact disks ("CDs"), memory sticks, etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium or product may be downloaded through an interface (e.g., 350) to the data processing system 300 from the network 351 by end users or potential buyers.

A user may interact with the data processing system 300 and its hardware and software modules 321, 331 using a user interface such as a graphical user interface ("GUI") 380 (and related modules 321, 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by selecting or "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 1:
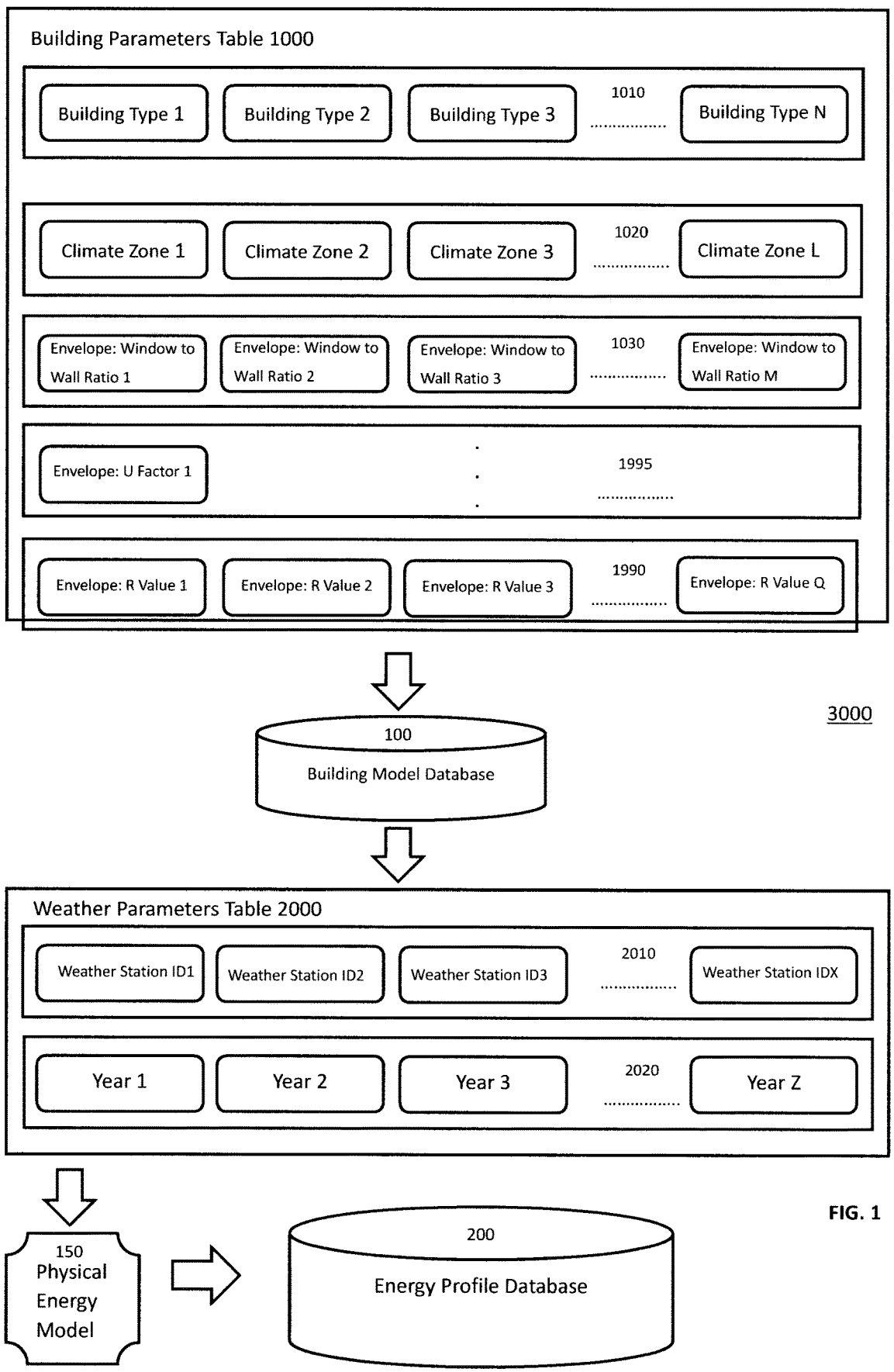
FIG. 1 is a block diagram illustrating a building analytics system for a building in accordance with an embodiment of the application.
Figure 2:
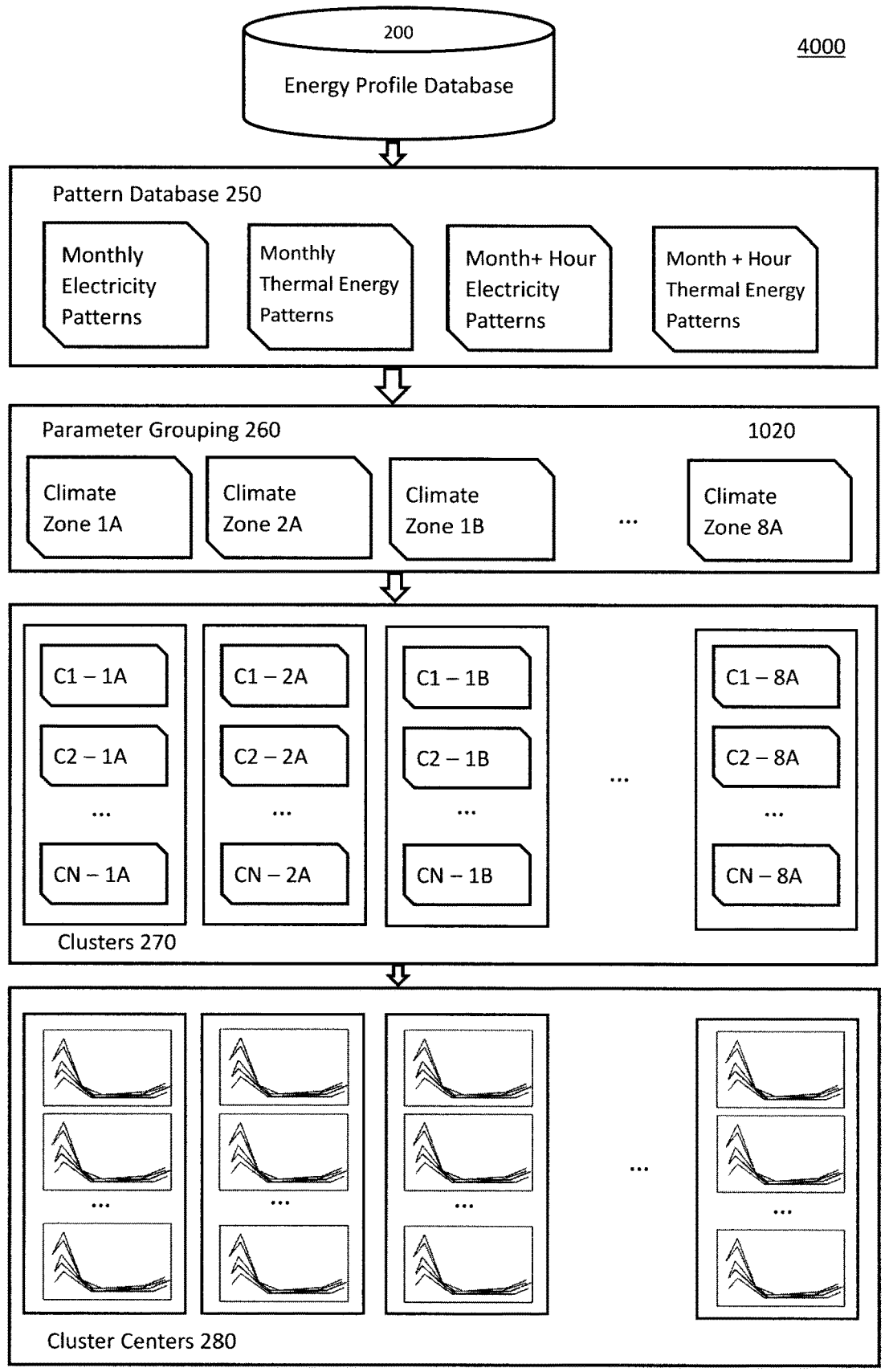
FIG. 2 is a block diagram illustrating an energy profile database and clustering system in accordance with an embodiment of the application.

FIG. 1 is a block diagram illustrating a building analytics system 3000 for a building in accordance with an embodiment of the application. And, FIG. 2 is a block diagram illustrating an energy profile database and clustering system 4000 in accordance with an embodiment of the application. The building analytics system 3000 and the energy profile database and clustering system 4000 may include, be incorporated in, or be implemented by the data processing system 300.

According to one embodiment, the building analytics system 3000 may include a building parameters table 1000, a building model database 100, a weather parameters table 2000, a physical (i.e., virtual) energy model or module 150, and an energy profile database 200 (e.g., within 332). In addition, the energy profile database and clustering system 4000 may include the energy profile database 200 (e.g., within 332), a pattern database 250 (e.g., within 332), a parameter grouping model or module 260, and a cluster centers model or module 280.

According to one embodiment, the goal of the clustering system 2000 is to deliver the closest possible building model 740 for a client building 860 (i.e., a building operated and/or owned by a client) based on that building's historical energy consumption data. The underlying assumption of clustering based on historical energy data is that energy data represents in and of itself an identifiable pattern unique to that type of building. For example, a large office building with having particular set of characteristics (such as building envelope including window-to-wall ratio, R and U factors of walls and windows, etc.) would resemble another large office building having similar characteristics, and may be distinguished from buildings with other characteristics (e.g., different building type (e.g., small office or hospital), different window-to-wall ratios, etc.).

By generating a representative building model database 100 that covers most existing buildings in the real world, unique energy profiles associated with representative buildings may be generated. It is then possible to use a client building's unique energy profile to obtain a close match with an energy profile of a representative building model in the database 100, resulting in a ready-made building model which accurately stands in for the client building 860, and a related advanced AI-based building energy model 600. Advantageously, this may significantly reduce production time in building-model setup and make the process scalable to a larger number of buildings.

With respect to the building model database 100, the term "building model" refers to a file in a text-based format consisting of a detailed description of a client building 860 in terms of construction, materials, operations, and energy sources (e.g., electricity, gas, oil, coal, etc.). It is used in conjunction with weather data as inputs for a physical simulator software module 150, which outputs the energy consumption of a building over a period of time for which the weather was specified. Each building model in the database 100 carries a set of particular distinct characteristics that account for a general scope of all possible buildings worldwide, and is continuously expanded to reflect all possible buildings with more model accuracy and in more locations.

For example, as a starting point, the building model database 100 may include the publicly available reference models developed by the United States Department of Energy ("DOE") and designed to encompass 70% of all buildings in North America. These pre-made building models may be downloaded as files with ".IDF" extensions for different building types (e.g., large office, small office, hospital, etc.), construction specification (e.g., American Society of Heating, Refrigerating and Air-Conditioning Engineers ("ASHRAE") pre-1980, post-1980, new-construction) and climate zone specifications (also specified by ASHRAE). These models may be used as inputs for a physical energy simulator, model, or module 150 (e.g., the DOE's Energy Plus™ program) to produce yearly energy profiles specific to these buildings. EnergyPlus™ is a whole building energy simulation program that engineers, architects, and researchers use to model both energy consumption (for heating, cooling, ventilation, lighting and plug and process loads) and water use in buildings. With respect to the energy profile database 200, the output of the simulator 150 is a high temporal resolution dataset, showing building energy consumption in 15 minute intervals or time-steps. The outputs chosen to be used in the high resolution dataset may include electricity and thermal energy profiles (produced by gas, oil, coal, etc.). These outputs are converted into two formats to be used for matching with the client building's historical data: (1) monthly energy profiles; and, (2) month-by-hour rough profiles, and are further referred to as "energy profiles". Monthly profiles represent the total sum of energy for each month of the year, providing a reliable method for building matching using the client's common energy inputs such as utility bills.

When the client has high-resolution temporal data available (hourly or sub-hourly), it is converted in a special "rough pattern" (or "rough sets" as referred to in machine-learning literature) format consisting of three statistical measures (i.e., mean, maximum and minimum values) for a representative day of each month. A representative day is obtained by taking the same hour from each day of the month, and extracting these three statistical measures from it.

For each building model in the building model database 100, the resulting high temporal resolution output of the simulator may be obtained. This output is then converted into energy profiles consisting of four different variations as follows: (1) Monthly energy profile for electricity consumption (12 values); (2) Monthly energy profile for thermal energy consumption (12 values); (3) Month×hour rough patterns for electricity consumption (12×24×3 values); and, (4) Month×hour rough patterns for thermal energy consumption (12×24×3 values).

By splitting the energy profile database 200 in these four constituents 250, the flexibility to account for multiple energy sources and to take advantage of high temporal resolution energy consumption data when it is available to obtain a better building model match, is obtained.

With respect to parameters and values 1000 of the building model database 100, in order to match a client building 860 with a building model based on its energy consumption, a building database with a significant scope in terms of building parameters and their values is used, such that any variation of the client building construction and operation may be captured by at least one building in the building database. Such a scope is defined by building type, climate zone specification, building envelope, occupancy, and energy use.

Referring to the building parameters table 1000 shown in FIG. 1, types of buildings 1010 may include agricultural buildings, commercial buildings, residential buildings, medical buildings, educational buildings, government buildings, industrial buildings, military buildings, parking structures and storage, religious buildings, transport buildings, non-buildings, infrastructure, power stations, and others (e.g., see https://en.wikipedia.org/wiki/List_of_building_types, which is incorporated herein by reference).

A climate zone specification includes the configuration of building materials and properties, HVAC configuration, and a variety of other factors included in the building model that will differ depending on the ASHRAE climate zone, yet will not change the geometrical model of the building (e.g., number of floors, size of the building, etc.).

The building envelope of a building includes all the elements of the outer shell that maintain a dry, heated, or cooled indoor environment and facilitate its climate control. The building envelope may include the following building systems: below grade system, wall system, fenestration system, roofing system, and atria system. Each of these systems has its key parameters, such as R-values 1990 for the wall system and window-to-wall ratios 1030 and window U-factors for the fenestration system, stored in the building parameters table 1000.

The term "building occupancy" refers to categorizing structures based on their usage. Building occupancy classifications are usually defined by model building codes. The following list is based on the International Building Code, the most commonly used building code in the United States: (1) Assembly (Group A)—places used for people gathering for entertainment, worship, and eating or drinking; (2) Business (Group B)—places where services are provided (not to be confused with mercantile, below). Examples include: banks, insurance agencies, government buildings (including police and fire stations), and doctors' offices; (3) Educational (Group E)—schools and day care centers up to the 12th grade; (4) Factory (Group F)—places where goods are manufactured or repaired (unless considered "High-Hazard" (see below)). Examples include: factories and dry cleaners; (5) High-Hazard (Group H)—places involving production or storage of very flammable or toxic materials; (6) Institutional (Group I)—places where people are physically unable to leave without assistance. Examples include: hospitals, nursing homes, and prisons. In some jurisdictions, Group I may be used to designate Industrial; (7) Mercantile (Group M)—places where goods are displayed and sold. Examples include: grocery stores, department stores, and gas stations; (8) Residential (Group R)—places providing accommodations for overnight stay (excluding Institutional). Examples include: houses, apartment buildings, hotels, and motels; (9) Storage (Group S)—places where items are stored (unless considered High-Hazard). Examples include: warehouses and parking garages; and, (10) Utility and Miscellaneous (Group U)—others. Examples include: water towers, barns, towers.

According to one embodiment, the scope of the building model database 100 is defined by identifying the principal parameters governing energy dynamics in the building, and varying the values of these parameters. As an example of the principal parameters, the scope may include five key parameters as follows: (1) Building type 1010; (2) Climate zone specification 1020; (3) Envelope: Window-to-Wall Ratio 1030; (4) Envelope: R-values 1990; and, (5) Envelope: Window U-factors 1995. As an example of parameter values, the R-value of the building envelope value may be varied from 1 to 4.

According to one embodiment, the scale of the building model database 100 is defined by the number of key parameters. For example, the combination of all values of the parameters 1010, 1020, 1030, 1990 may produce an initial database 100 having 14,400 building models. These models may be simulated using EnergyPlus™ software (for example) 150 to produce energy consumption profiles 200 when combined with weather data 2000, which are then used for matching when the clustering application is presented with the historical data of the client building 860 as described below.

According to one embodiment, the building model database 100 is designed to be continuously expandable, allowing the addition of new values to existing parameters and entirely new parameters without any interference with the operation of the clustering logic.

As briefly mentioned above, according to one embodiment, weather inputs are also used in the generation of energy profile outputs 200. Weather is the state of the atmosphere, to the degree that it is hot or cold, wet or dry, calm or stormy, clear or cloudy. Most weather phenomena occur in the lowest level of the atmosphere, the troposphere, just below the stratosphere. The term "weather" generally refers to day-to-day temperature and precipitation activity, whereas the term "climate" is used for the averaging of atmospheric conditions over longer periods of time. Geographic climate zones are defined by ASHRAE climate zone classification. Using varied weather data 2000 in combination with the building model database 100 may produce several energy profiles 200 for each of the buildings in the database 100, allowing for redundancy and robustness when matching a client building 860 with the resulting energy profiles.

According to one embodiment, weather data is chosen based on two parameters: (1) the weather station providing the weather data; and, (2) the year(s) the data was collected. By simulating a building model at various geographical locations (using different weather stations for the same model), and using multiple years of weather data for the simulations, a much larger energy profile database may be obtained due to the addition of these two extra parameters. For example, the common values for weather stations may be chosen to be the geographical locations of major cities in the United States and Canada (due to the abundant number of commercial buildings present at those locations) and 2013, 2014 and 2015 weather forecast years.

Figure 3:
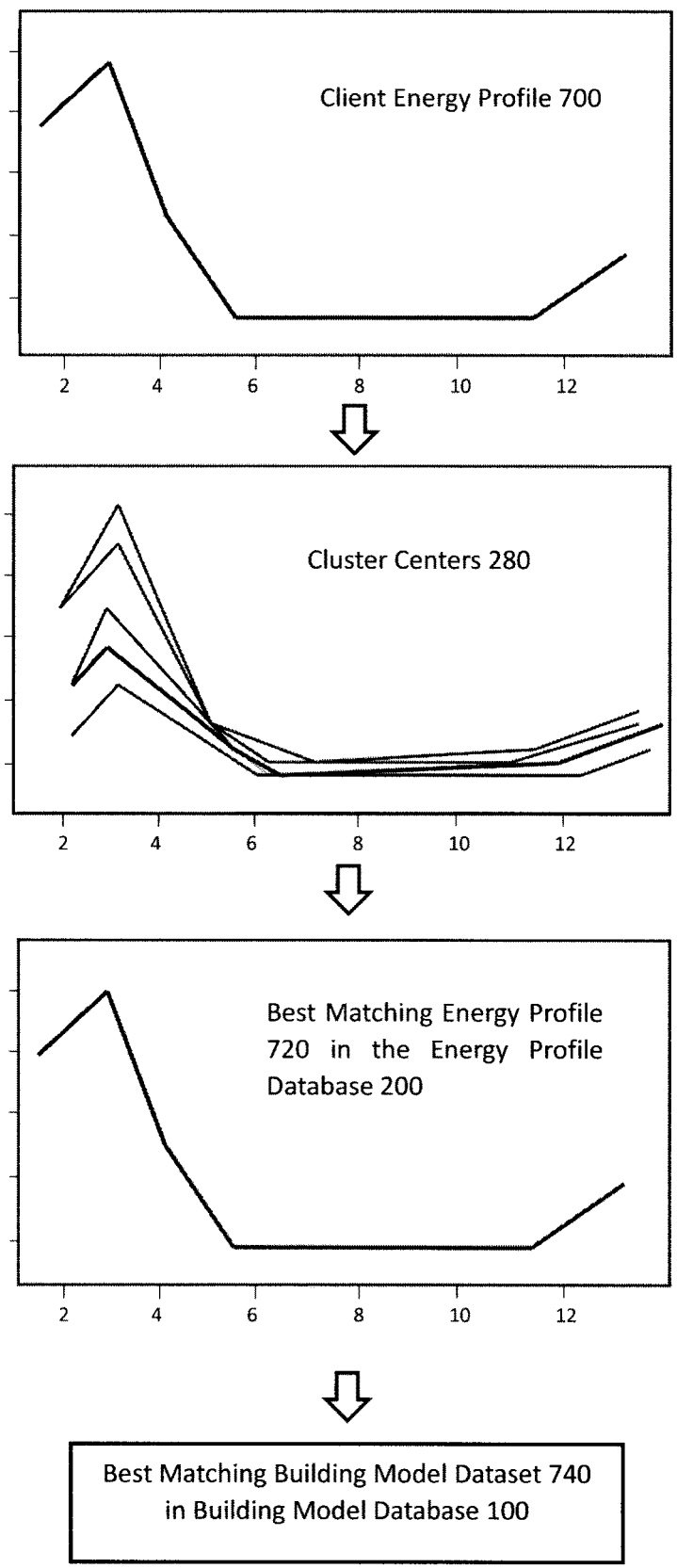
FIG. 3 is a flow chart illustrating operations for determining a best matching energy profile and building model dataset in accordance with an embodiment of the application.
Figure 4:
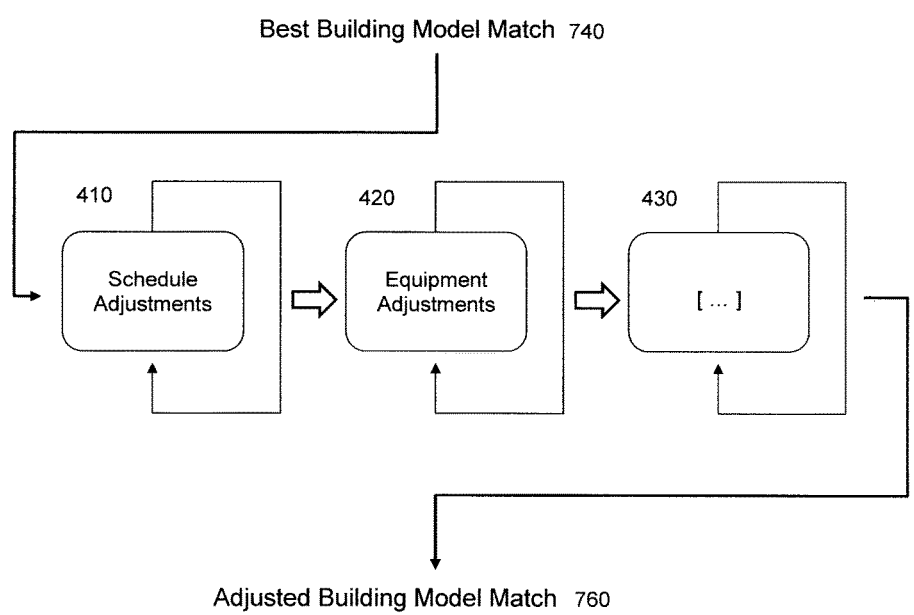
FIG. 4 is a flow chart illustrating operations for manual adjustment of a building model dataset in accordance with an embodiment of the application.
Figure 5A:
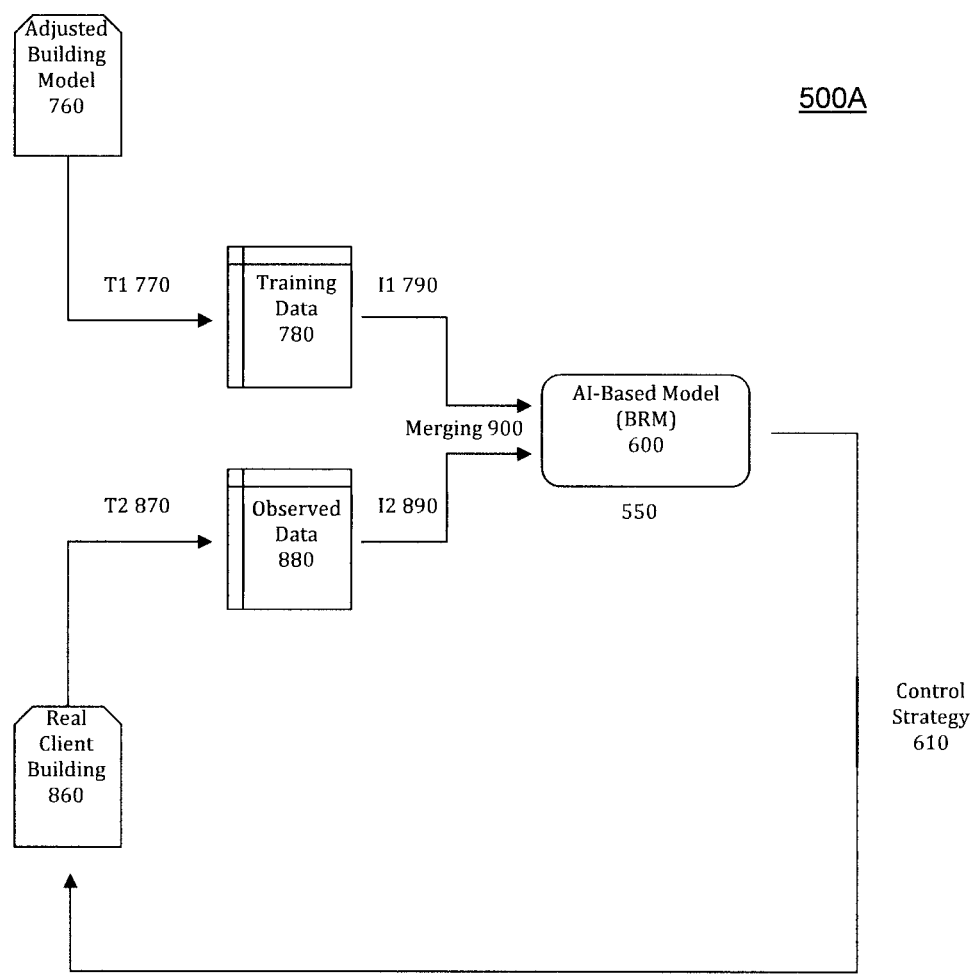
FIGS. 5A, 5B, and 5C are flow charts illustrating operations for generating an AI-based building energy model in accordance with an embodiment of the application.
Figure 5B:
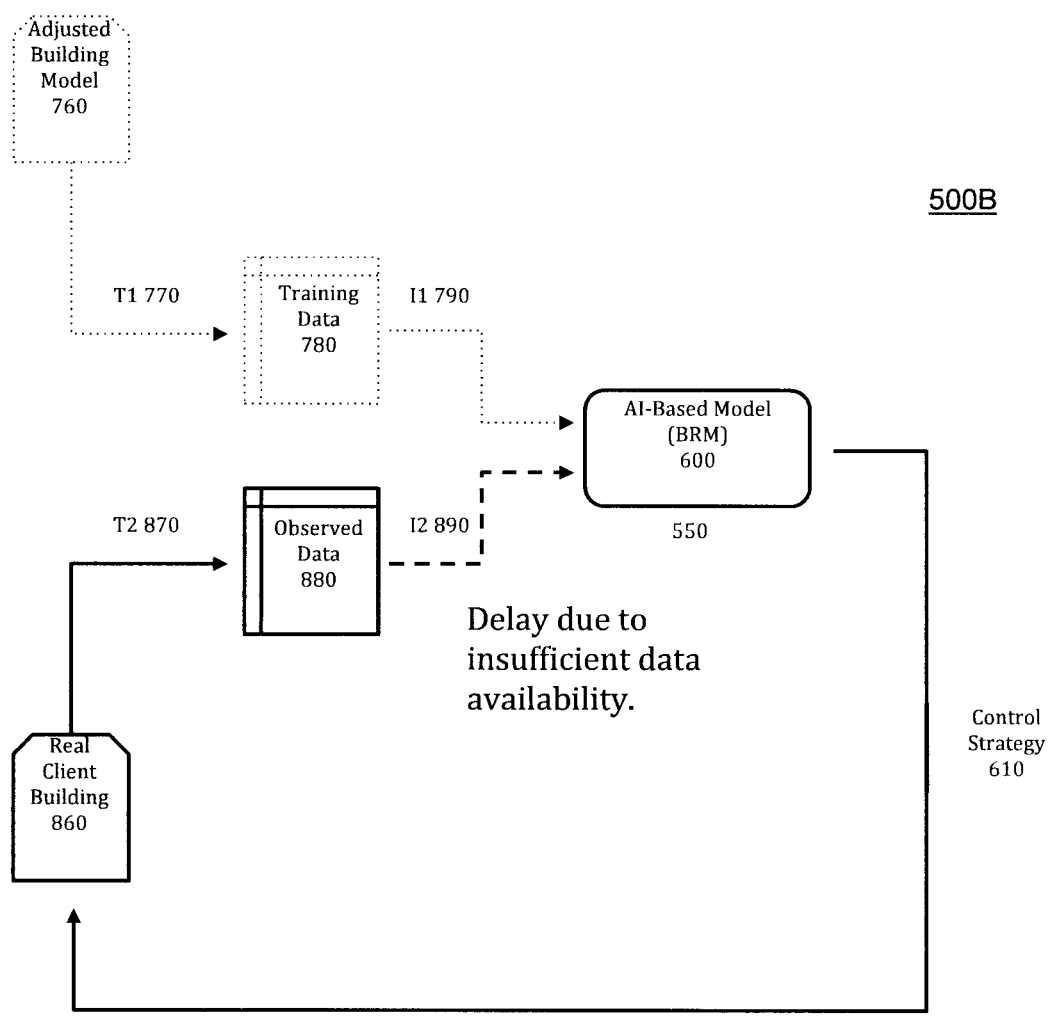
Figure 5C:
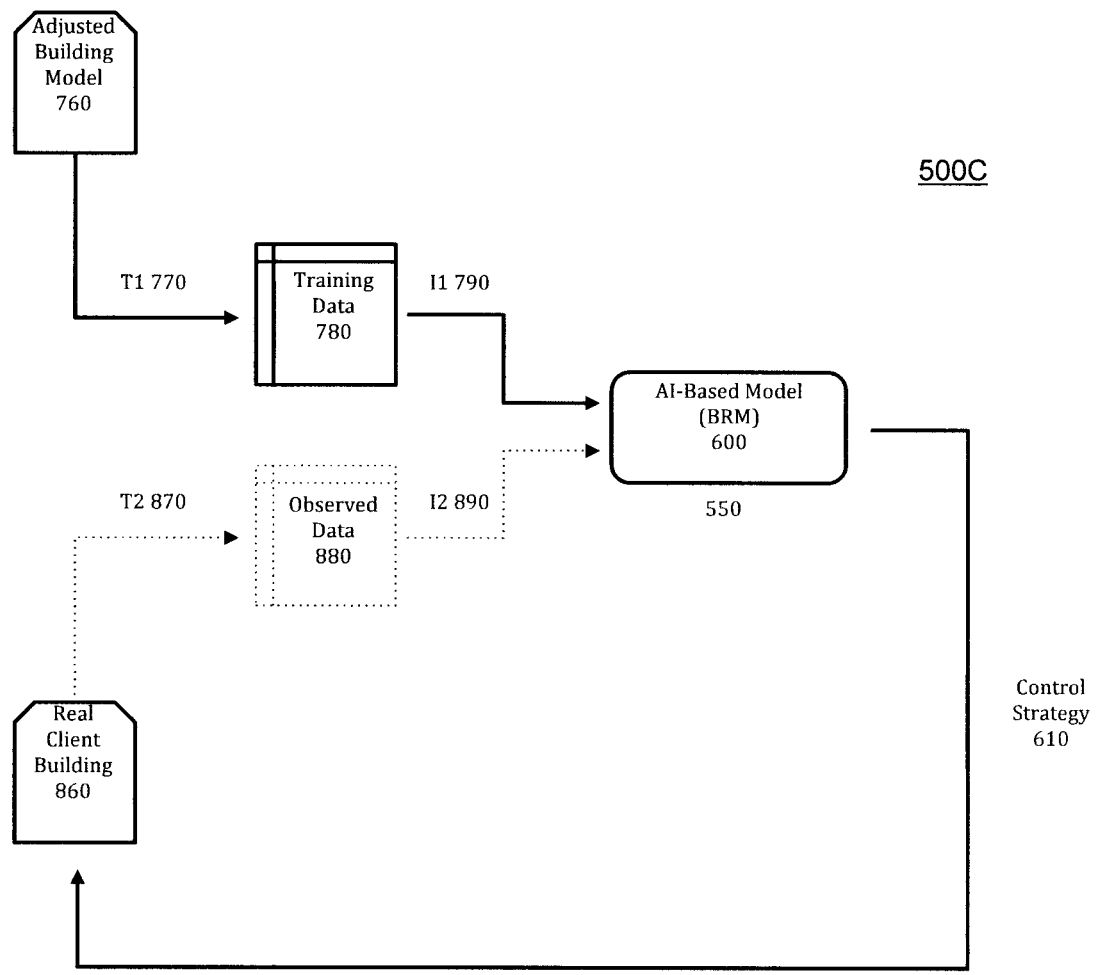
Figure 6:
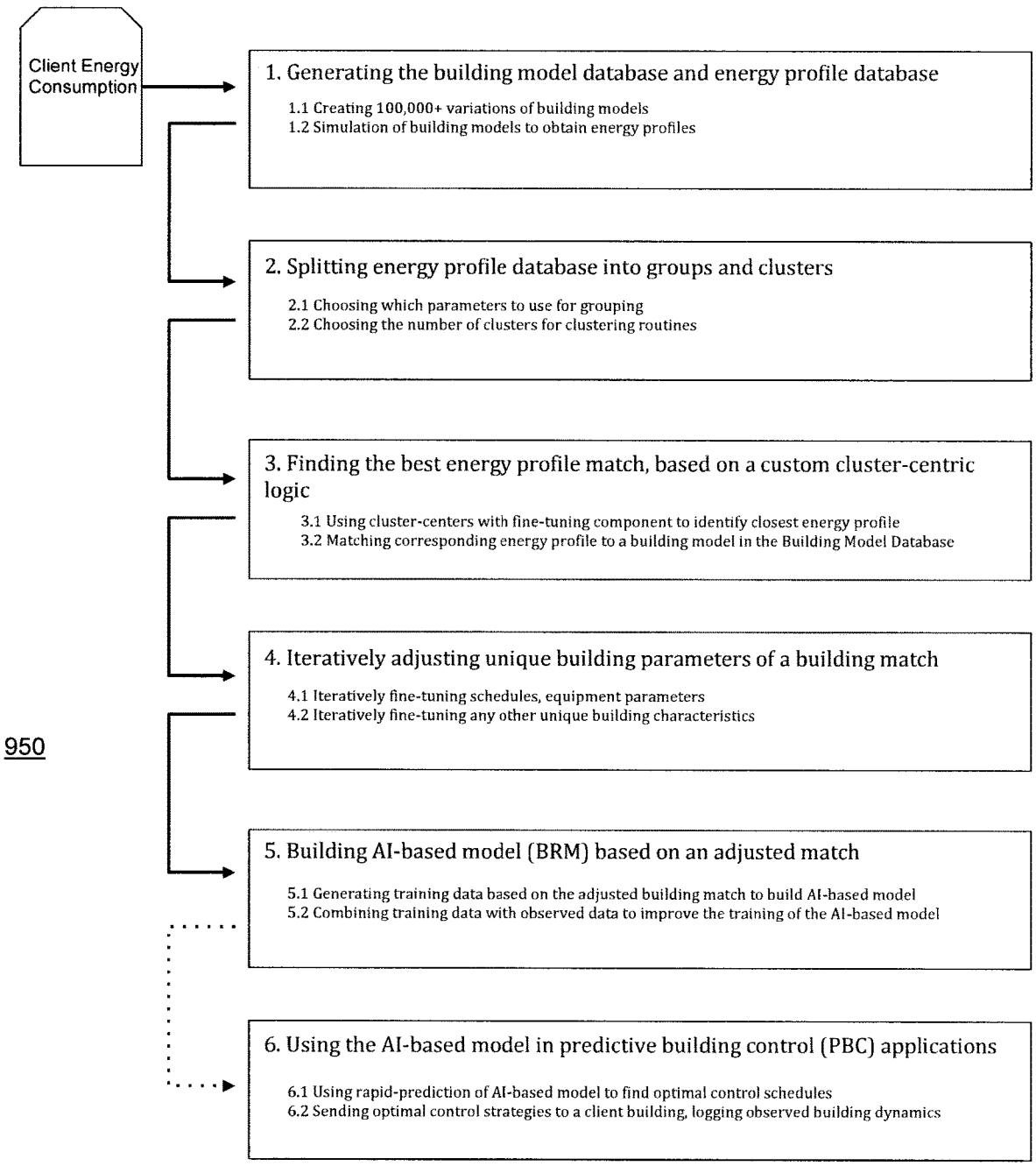
FIG. 6 is a flow chart illustrating operations for generating an AI-based building energy model in accordance with an embodiment of the application.

FIG. 3 is a flow chart illustrating operations for determining a best matching energy profile 720 and building model dataset 740 in accordance with an embodiment of the application. FIG. 4 is a flow chart illustrating operations 400 for manual adjustment of a building model dataset in accordance with an embodiment of the application. FIGS. 5A, 5B, and 5C are flow charts illustrating operations 500A, 500B, 500C for generating an AI-based building energy model 600 in accordance with an embodiment of the application. And, FIG. 6 is a flow chart illustrating operations 950 for generating an AI-based building energy model 600 in accordance with an embodiment of the application.

Referring to FIGS. 3-6, the steps for generating an AI-based building energy model 600 for a client building 860 according to one embodiment of the application are described in the following. These steps are summarized in FIG. 6.

Step 1: Generating Building Model and Energy Profile Databases 100, 200. The initial building model database 100 is generated by creating a combination of all values for all parameters 1000, chosen from an engineering standpoint to be the most representative factors in modeling a building for energy matching purposes.

Referring again to FIG. 1, a database of building models 100 and profiles 200 is created. For example, the building model scope may include five key parameters 1000 as follows: (1) Building type 1010: Large office, post-1980 construction; Medium office, post-1980 construction; Medium office, pre-1980 construction; Small office, post-1980 construction; Primary school, post-1980 construction; and, Secondary school, post-1980 construction; (2) Climate zone specification 1020: 1A (e.g., like Miami, Fla.); 2A (e.g., line Houston, Tex.); 2B (e.g., like Phoenix, Ariz.); 3A (e.g., like Atlanta, Ga.); 3B—Coast (e.g., like Los Angeles, Calif.); 3B (e.g., like Las Vegas, Nev.); 3C (e.g., like San Francisco, Calif.); 4A (e.g., like Baltimore, Md.); 4B (e.g., like Albuquerque, N.M.); 4C (e.g., like Seattle, Wash.); 5A (e.g., like Chicago, Ill.); 5B (e.g., like Boulder, Colo.); 6A (e.g., like Minneapolis, Minn.); 6B (e.g., like Helena, Mont.); 7 (e.g., like Duluth, Minn.); and, 8 (e.g., like Fairbanks, Ak.); (3) Envelope—Window-to-Wall Ratio 1030: 20%; 30%; 40%; 50%; 60%; and, DOE default; (4) Envelope—R-values 1990: 1; 2; 3; 4; and, DOE default (note that R-values 1990 are typically expressed in Kelvin square meters per Watt ($Km^2/W$)); and, (5) Envelope—U-factors 1995: 1; 2; 3; 4; and, DOE default (note that U-factors 1995 are typically expressed in Watts per square meter Kelvin ($W/m^2$ K)).

The starting point of the building model database 100 includes 14,400 buildings. Each model is matched with an appropriate weather station for its climate zone specification (located at the coordinates of the largest city) and simulated with three years of weather data, resulting in 43,200 building energy profiles. The number of profiles may be further extended to 500,000 buildings, in the early development stage, by increasing the number of values to the weather selection process (weather stations/years) and increasing the number of values for the building type parameter in the building model database 100.

Scripted generation may be used to add building model variations. The initial set of prototype models may be obtained from the United States Department of Energy ("DOE") (available for download at https://energy.gov/eere/buildings/commercial-reference-buildings). These model files may be programmatically parsed using regular expressions and custom parameter values may be inserted into selected fields in the building model files. To expand upon the prototypical models (which broadly encompass 70% of US buildings, but may lack the specificity to match all the possible client buildings), custom building models may be internally generated and added to the building model database 100, as are all variations applied to them. The resulting energy profile database 200 is then used as a starting point for the clustering logic.

Step 2: Clustering of Energy Profile Database 200. Referring again to FIG. 2, there is shown clustering logic for clustering of the energy profile database 200. The purpose of the clustering logic is to split the energy profile database 200 into a number of groups 260 representing an aggregate of buildings with similar characteristics. These groups may be summarized by a single energy profile unique to each group, which can stand in for the individual data of each group. This reduces the search space and reduces the time needed to find the best match.

Clustering of the energy profile database 200, as opposed to other methods of splitting it into groups 260, is an algorithmic approach that outputs group center in addition to group membership information. A "group center" (or "cluster center") 280 is a representative energy profile that did not exist as a part of the energy profile database 200, but is numerically generated based on the energy profiles of the buildings comprising each cluster 270. Once the centers 280 have been identified by the clustering algorithm, all energy profiles are assigned to the closest group center (thus determining their group membership).

The process of splitting the energy profile database 200 into clusters 270 is performed separately for each of the four pattern databases 250 described above, namely, the monthly electricity and thermal databases and the month×hour rough pattern electricity and thermal databases.

With respect to the implementation of the clustering logic, the energy profiles database 200 may be developed from 14,400 buildings (for example) and may dynamically grow in size. To split this large number of energy profiles into groups, two approaches may be combined: manual (supervised) grouping based on existing parameters; and, automatic (unsupervised) grouping based on clustering algorithms.

In the first ("manual") approach, splitting based on manually selected parameters, energy profiles are separated into separate groups based on known attributes about the buildings (such as climate zone specification 1020, building type 1010, etc.). For example, in FIG. 2, climate zone specifications 1020 are used as a grouping parameter, thus all the buildings are first split into 16 climate specification groups (for example), before proceeding with the use of clustering algorithms. According to one embodiment, additional grouping parameters may also be applied, or all of the grouping parameters may be removed, resulting in the clustering step commencing from the start.

In the second ("automatic") approach, a fuzzy c-means clustering algorithm is used to split the energy profiles into clusters 270 based solely on the profile values (e.g., monthly electricity values from January to December). Each resulting cluster is characterized by a group center 280, that is, a numerically calculated energy profile which represents all buildings in the cluster 270. Each building in a cluster is given a coefficient of discrepancy from the cluster key thus sorting each building in terms of how representative it is of the cluster 270.

Two layers of clustering may be performed. First, the buildings may be clustered on primary energy source (e.g., electricity). Second, the resulting buildings in each cluster may be further subdivided into clusters based on secondary energy source (e.g., thermal energy: gas, oil, coal, etc.). This two-layer subdivision allows for fine-matching of buildings when data for both energy sources is available. If the thermal energy data is missing for the client's building, matching is performed using the primary energy source only.

According to one embodiment, changing cluster configurations is supported. Due to the stochastic nature of clustering algorithms, different cluster centers and memberships may be obtained each time the clustering algorithm is run. With each clustering run, the resulting cluster centers and cluster membership information is saved to memory 330 (e.g., disk), providing a complete record of all clustering runs performed in the past.

With the addition of new batches of energy profiles from simulated models, the energy profile database 200 may be re-clustered to include the newest available data. This allows for adjustments in which building parameters are used for grouping in Step 1 and adjustments of cluster numbers in Step 2.

Step 3: Matching the Client Building 860 with the Clustered Energy Profile Database. Operations for matching the client building 860 with the clustered energy profile database are shown in FIG. 3. As an overview of the matching logic, once all the building energy profiles have been clustered, several approaches may be used to find the best match between the client building 860 and the energy profiles in the database. The main approach used in this system 4000 is center-based matching with per-cluster adjustments. Other matching approaches are also possible, such as center-based matching with smallest profile-to-center discrepancy, or cluster-independent per-profile matching. All matching is performed using a discrepancy metric, in which the client's energy usage is subtracted from the building energy profile in the database, the absolute value of the difference is taken and summed across all the points (e.g., months—in the case of monthly profiles, or month-hours—in case of rough pattern profiles). The final sum represents the discrepancy between the client and the energy profile, with the smallest discrepancy being associated with the closest match.

Per-profile matching is the simplest form of matching a client building's energy data with the energy profile database that may be used. A client building's profile 700 is compared individually with each energy profile in the database 200, and the building with the smallest energy discrepancy out of the entire database is determined to be the best match 740. One shortcoming of this method is that it is computationally expensive. It may become obsolete as the size of the energy profile database grows or when granular rough pattern energy profile data is available (as it requires significantly more computation compared with monthly energy profiles).

Center-based matching with smallest profile-to-center discrepancy may also be used. The most widely used approach to matching is based on the grouping of the data into clusters 270, with each cluster having its unique representative energy profile (cluster center) 280. For example, consider the matching performed on monthly data. It may be visualized as performing a difference between each month of the client's energy consumption data 700 with each cluster center 280. Given that group-splitting was manually performed using the climate zone specification parameter (e.g., using 16 climate zones), which was then followed by clustering each subgroup into 10 clusters, a matrix with 16 rows by 10 columns (climate zone×cluster numbers) is obtained. For each element of the matrix, the discrepancy calculation is performed, and the element with the lowest value in the matrix is indicative of the best cluster match. Next, to find the representative building from the best cluster match, an energy profile with the closest similarity coefficient to the center of the cluster is selected. Similarity coefficients are values from zero to one assigned to each energy profile during the clustering step. They allow each energy profile in a cluster 270 to be numerically sorted in terms of proximity to its cluster center 280. The shortcoming of using the similarity coefficient, is that another building in this cluster may be closer to the client's energy profile data, thus the chosen match 740 may be close to the client and yet may still be suboptimal.

Center-based matching with per-cluster adjustments may also be used as the preferred matching method. To address the issue in the profile-to-center discrepancy method, the similarity coefficient comparison may be replaced with a manual discrepancy calculation between each building energy profile in the cluster and the energy consumption data 700 of the client. The building with the smallest discrepancy in this step is chosen as the best match 740, disregarding its coefficient of similarity to the cluster center 280.

With respect to multiple energy consumption metrics, in the case when the client building 860 has data on thermal energy consumption in addition to electrical consumption, a match on a thermal cluster may be further obtained (using the same center-based matching with per-cluster adjustments method described above), and both electricity and thermal discrepancies may be normalized and summed together. The lowest value is selected from these sums to represent the best match 740.

Once the energy profile match 720 has been identified using the energy profile database 200, a corresponding physical building model 740 for that energy profile is fetched from the building models database 100 and may be used as a starting point for manual adjustments.

Step 4: Manual Adjustment of the Physical Building Energy Model 740 for the Client Building 860. Referring to FIG. 4, once the best model match 740 has been identified, it is manually adjusted to incorporate parameters uniquely specific to the client building 860. These parameters that vary from building to building may include load levels (e.g., people, lights, equipment, etc.), building schedules, equipment efficiencies and default control strategies (e.g., pre-set thermostat configurations for different times of day, etc.). These parameters are excluded from the building model database 100 on purpose, as the values that they may take on require a number of simulations that may exceed computational capabilities, and may be quickly configured through manual intervention.

To maximize the efficiency of this step, according to one embodiment, a GUI tool (e.g., 380) may be provided that allows a user to iteratively change values in bulk, and compare them with the client energy profile, such that the best model match 740 may be further fine-tuned to approximate the building model based on the client building's energy profile.

According to one embodiment, the best model match 740 will undergo schedule adjustments 410 and equipment parameter specification adjustments 420, and any other number of component adjustments 430 that may pertain to the individual characteristics of the client building 860. The iterative approach is an advantageous feature of the method as it provides a rapid approach for fitting most customized values using minimal user intervention. The final result is a fine-tuned adjusted building model 760 that may be used as a starting point for generating an AI-based building model 600.

Step 5: Generation of an AI-Based Building Energy Model 600 using the Adjusted Model 760 and Client Building Data 880. Referring to FIGS. 5A, 5B, and 5C, operations 500A, 500B, 500C are described in the following for generating an AI-based building energy model 600 using both the adjusted building model (or IDF model) 760 and observed building data 880 (see FIG. 5A), using only the observed building data 880 (see FIG. 5B), and using only the adjusted IDF model 760 (see FIG. 5C).

Referring to FIG. 5A, according to one embodiment, the adjusted building model 760 is used as an input to a physical energy simulation software module 550, that is, AI-based modeling software, algorithms, or modules such as EnergyPlus™ as described above (150). Through a first training dataset generation module T1 770, the adjusted building model 760 may be used to generate a number of training datasets 780 which conform to the specifications of a first input training dataset module I1 790 which is in turn used to input the training datasets 780 to the physical energy simulation software module 550. The physical energy simulation software module 150 then generates and outputs an AI-based building energy model 600 (which may be referred to as a building response model ("BRM")).

The first training dataset generation module T1 770 may use various climatic conditions with various building control strategies in order to generate a cohesive representation of the client building's dynamics under various internal and external conditions. The first input training dataset module I1 790 includes the application of machine learning algorithms and the use of datasets of building dynamics to generate an AI-based building energy model 600 using the physical energy simulation software module 550. The AI-based building energy model 600 may be used to predict building state and energy consumption rapidly and in real-time.

Once the AI-based building energy model 600 has been generated, it may be used in a process for optimizing control strategies 610 for a client building 860, in which the rapidly-available predictions of the AI-based building energy model 600 may be used in optimization routines to find the least energy-consumption strategies using various inputs (e.g., an upcoming weather forecast, etc.). The optimal control strategy is then passed on to a client building 860, which in turn exports data about the custom control strategy and all associated variables to an observed dataset 880. A second training dataset generation module or logging process T2 870 is generally operated through a building automation system ("BAS") 300, which is capable of recording and exporting variables pertaining to the building's ongoing state. The observed dataset 880 is constructed to reflect the structure of the training dataset 780, such that the second input training dataset module I2 890 may apply machine learning algorithms in a manner similar or identical to that of the first input training dataset module I1 790. Advantageously, the availability of both training data 780 and observed data 880 allows for special data-merging conditions 900 in which the training data 780 may be further improved to reflect the observed data 880, thus improving the overall prediction quality of the AI-based building energy model 600. Aspects of the first dataset generation module T1 770, the first input training dataset module I1 790, and the control strategy process 610 are described in United States Patent Application Publication No. 2016/0305678 by Pavlovski, et al. (published Oct. 20, 2016 and entitled "Predictive Building Control System and Method for Optimizing Energy Use and Thermal Comfort for a Building or Network of Buildings"), which is incorporated herein by reference.

Referring to FIG. 5B, the adjusted building model 760 is absent from the operations 500A shown in FIG. A. The operations 500B of FIG. 5B shows only the observed data 880 being used as an input for generation of the AI-based building energy model 600. One shortcoming of this approach may be observed with respect to the second input training dataset module I2 890 in which the amount of observed data 880 is insufficient to build the AI-based building energy model 600, since the quality of AI-based model predictions is dependent on a sufficient number of observations in the training data.

Referring to FIG. 5C, the observed data 880 is absent from the operations 500A described in FIG. 5A. The full process of generating optimal control strategies 610 and providing them to the client building 860 may be performed given the availability of the adjusted building model 760. However, the lack of observed data 880 detracts from any improvement of the AI-based building energy model 600 over time.

Step 6: Building Control Optimization Using An AI-Based Building Energy Model 600. Referring to FIGS. 5A, 5B, and FC, the AI-based building energy model 600 (or BRM) is a rapid-prediction model that has been trained on the datasets generated through a physical simulation software module 550 using the adjusted building model 760. The AI-based building energy model 600 may be used for generating and sending control strategies (or signals) 610 to the client building 860 which provides the client with optimal control of the building in terms of energy efficiency. The optimal control strategy 610 is made possible due to the rapid prediction ability of the AI-based building energy model 600. The use of an adjusted detailed model 760 alone does not computationally allow for the generation of optimal control strategies due to the latency of the physical software simulations associated with the detailed models.

The manual generation of the adjusted building model 760, in contrast to the processes described above in steps one through five, is a labour-intensive process that stalls the development of optimal control strategies 610 for the client building 860. Advantageously, using a pre-existing database of detailed building models that can be used to match a client building and also used to generate training data 780 for AI-based building energy models 600, results in the timely production of optimal control strategies 610 for any given building 860.

In the following, examples of dynamic clustering of energy consumption profiles for building energy modeling are described. According to one embodiment, an approach to dynamic clustering of energy consumption profiles is provided having the following steps.

Step K1: Collect a large number of weather files from weather stations spread across the region.

Step K2: Extract average, minimum, and maximum hourly profiles for all the twelve months for important weather parameters such as temperature, solar radiation, wind speed, and humidity.

Step K3: Determine appropriate number of clusters for the weather parameters and create clustering schemes such as T={t1, t2, . . . , t5} for temperature, S={s, s2, . . . , s10} for solar radiation, W={w1, w2, . . . , w5} for wind speed, H={h1, h2, . . . , h5} for humidity Step K4: Find the best representative for each cluster such as ti, si, wi, hi, where i=1, . . . , 5 or 10. Find a representative for each cluster combination such as ti-sj-wk-hl, where I,j,k,l=1, . . . , 5 or 10

Step K5: Rank the representatives from step K4 based on the size of sample that they represent.

Step K6: Based on the priority assigned in step K5, create hypothetical buildings at the weather station locations based on various usage types such as offices/school/mall, orientation in degrees, number of floors, occupancy, and envelope such as glass/brick.

Step K7: Use EnergyPlus™ simulations to generate thermodynamic profiles for buildings from step K6.

Step K8: Extract average, minimum, and maximum hourly profiles for all the twelve months for the energy usages.

Step K9: Determine appropriate number of clusters for the energy and create clustering scheme such as E={e1, e2, . . . , e5}.

Step K10: Use the clustering schemes in addition to clustering schemes such as T={t1, t2, . . . , t5} for temperature, S={ s1, s2, . . . , s10} for solar radiation, W={w1, w2, . . . , w5} for wind speed, H={h1, h2, . . . , h5} for humidity.

Step K11: Find the best representative for each cluster such as ti, si, wi, hi, ei, where i=1, . . . , 5 or 10. Find a representative for each cluster combination such as ti-sj-wk-hl-en, where i,j,k,l,n=1, . . . , 5 or 10

Step K12: Rank the representatives from step K11 based on the size of sample that they represent.

Repeat the following steps for each of the buildings from step K12 according to the ranked priority:

Step K13: Generate simulated thermodynamic profiles for the buildings from step K12 for different setpoint schedules.

Step K14: Use prediction techniques such as regression, neural networks, regression trees, random forests, support vector regression to accurately emulate the thermodynamic profiles: (a) The prediction models will be typically developed using weather parameters and setpoints as input; (b) Separate modules may be developed for different time periods; and, (c) There may be a further categorization of prediction models depending on external temperature.

Step K15: Use the prediction modules from step K14 to determine optimum setpoint schedule using evolutionary optimization techniques such as genetic algorithms.

Step K16: Cluster the output from optimization to create a small number of setpoint schedule scenarios.

Step K17: Build a decision tree that predicts the setpoint schedule scenario based on external conditions. The optimization and clustering results from steps K16 and K17 are used to create the training set.

Decision trees from step K17 make up the knowledge cloud, which may be used to create a decision module for the client.

According to one embodiment, another approach for generating a decision module for clients is provided having the following steps.

Step C1: Accept relevant information from the client about their building (e.g., a new building) such as latitude and longitude of the location, type of the building (e.g., offices/school/mall), orientation in degrees, number of floors, occupancy, and envelope such as glass/brick.

Step C2: Retrieve weather data from a weather station that is closest to the new building.

Step C3: Use EnergyPlus™ to simulate thermodynamic profiles for the new building.

Step C4: For the new building and its location, extract average, minimum, and maximum hourly profiles for all the twelve months for important weather parameters such as temperature, solar radiation, wind speed, and humidity as well as the energy profiles obtained from simulation.

Step C5: Identify the buildings from the knowledge cloud that best match the weather and energy profiles of the new building.

Step C6: Create a decision module that combines the decision trees of the buildings from the knowledge cloud identified in step C5.

Step C7: The decision module from step C6 is made available to the client for managing the setpoints for the new building.

Aspects of the above described methods and systems may be summarized with the aid of a flowchart.

Figure 8:
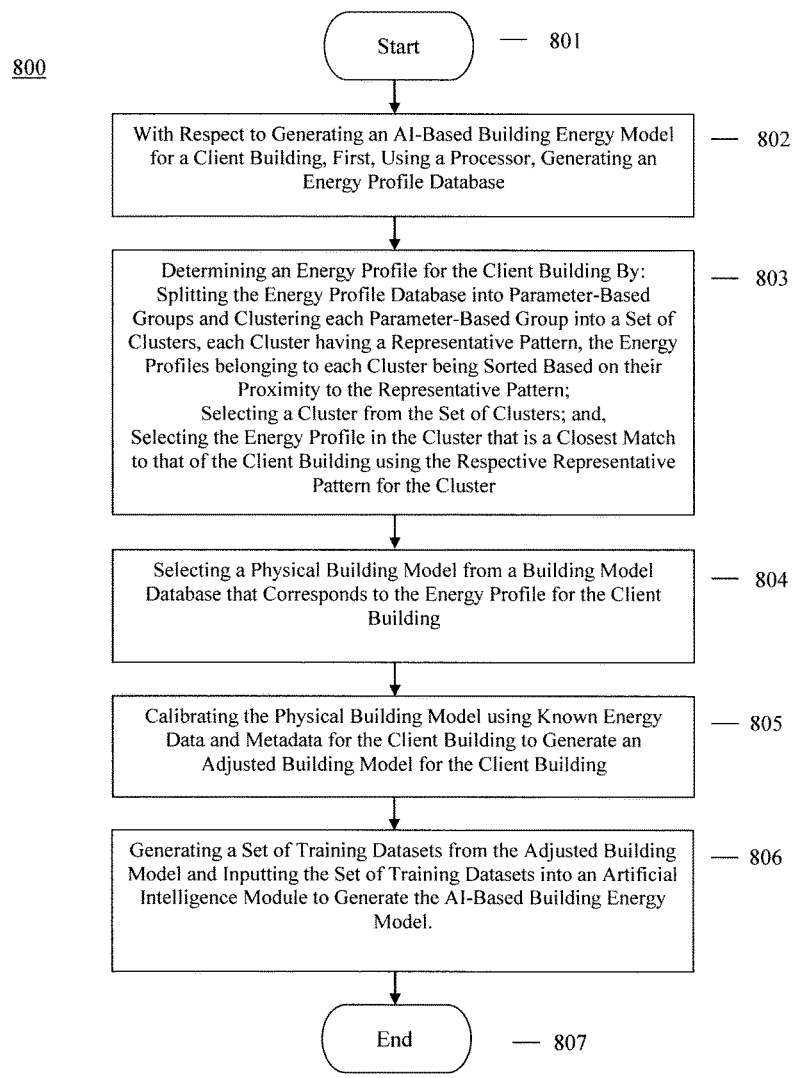

FIG. 8 is a flow chart illustrating operations 800 of modules (e.g., 331) within a data processing system 300 (e.g., a building analytics system 3000 and/or an energy profile dataset and clustering system 4000 within a building energy modeling system, a predictive building control system, a building energy management system, a utility demand response control system, a control system, a supervisory control and data acquisition ("SCADA") system, and/or an energy management system ("EMS")) for generating an AI-based building energy model 600 for a client building 860, in accordance with an embodiment of the application.

At step 801, the operations 800 start.

At step 802, using a processor 320, an energy profile database 200 is generated by: defining a set of building parameters 1000 including one or more of building types 1010, climate zone specifications 1020, and building envelope parameters including one or more of window-to-wall ratios 1030, R-values 1990, and U-factors 1995; generating energy profiles by simulating 150 a set of physical energy models corresponding to the set of building parameters 1000; and, populating the energy profile database 200 with the energy profiles;

At step 803, an energy profile 720 for the client building 860 is determined by: splitting the energy profile database 200 into parameter-based groups 260 and clustering each parameter-based group into a set of clusters 270, each cluster having a representative pattern 250, the energy profiles belonging to each cluster being sorted based on their proximity to the representative pattern 250; selecting a cluster from the set of clusters 270; and, selecting the energy profile 720 in the cluster that is a closest match to that of the client building 860 using the respective representative pattern 250 for the cluster.

At step 804, a physical building model 740 is selected from a building model database 100 that corresponds to the energy profile 720 for the client building 860.

At step 805, the physical building model 740 is calibrated using known energy data and metadata for the client building 860 to generate an adjusted building model 760 for the client building 860.

At step 806, a set of training datasets 780 is generated from the adjusted building model 760 and the set of training datasets 780 are input 790 into an artificial intelligence module 550 to generate the AI-based building energy model 600.

At step 807, the operations 800 end.

In the above method, the calibrating 805 may be performed manually using a graphical user interface ("GUI") 380. The method may further include aggregating observed operational building data for the client building 860 into an observed dataset 880 for the client building and combining 900 the observed dataset 880 with the set of training datasets 780 to thereby reduce error of the artificial intelligence module when generating the AI-based building energy model 600. The method may further include generating at least one control strategy 610 from the AI-based building energy model 600, the at least one control strategy thereby leveraging rapid energy-prediction capabilities of the AI-based building energy model 600. The method may further include transmitting the at least one control strategy 610 to the client building 860 to control operations thereof. The at least one control strategy 610 may include at least one control signal. And, the processor 320 may be at least one processor running within one or more of a building energy modeling system, a predictive building control system, a building energy management system, a utility demand response control system, a control system, a supervisory control and data acquisition ("SCADA") system, and an energy management system ("EMS") 300.

According to one embodiment, each of the above steps 801-807 may be implemented by a respective software module 331. According to another embodiment, each of the above steps 801-807 may be implemented by a respective hardware module 321 (e.g., application-specific hardware 321). According to another embodiment, each of the above steps 801-807 may be implemented by a combination of software 331 and hardware modules 321. For example, FIG. 8 may represent a block diagram illustrating the interconnection of specific hardware modules 801-807 (collectively 321) within the data processing system or systems 300, each hardware module 801-807 adapted or configured to implement a respective step of the method of the application.

According to one embodiment, one or more of the software 331 and hardware modules 321 (or to components referred to as a "module" herein) may be implemented by one or more data processing systems 300 or components thereof.

According to one embodiment, certain implementations of the functionality of the present application are sufficiently mathematically, computationally, or technically complex that application-specific hardware (e.g., 321) or one or more physical computing devices (e.g., 300) (using appropriate executable instructions (e.g., 331)) may be necessary or essential to perform that functionality, for example, due to the volume or complexity of the calculations involved and/or to provide results substantially in real-time.

While this application is primarily discussed as a method, a person of ordinary skill in the art will understand that the apparatus discussed above with reference to a data processing system 300 may be programmed to enable the practice of the method of the application. Moreover, an article of manufacture for use with a data processing system 300, such as a pre-recorded storage device or other similar computer readable medium or computer program product including program instructions recorded thereon, may direct the data processing system 300 to facilitate the practice of the method of the application. It is understood that such apparatus, products, and articles of manufacture also come within the scope of the application.

In particular, the sequences of instructions which when executed cause the method described herein to be performed by the data processing system 300 may be contained in a data carrier product according to one embodiment of the application. This data carrier product may be loaded into and run by the data processing system 300. In addition, the sequences of instructions which when executed cause the method described herein to be performed by the data processing system 300 may be contained in a computer software product or computer program product (e.g., comprising a non-transitory medium) according to one embodiment of the application. This computer software product or computer program product may be loaded into and run by the data processing system 300. Moreover, the sequences of instructions which when executed cause the method described herein to be performed by the data processing system 300 may be contained in an integrated circuit product (e.g., a hardware module or modules 321) which may include a coprocessor or memory according to one embodiment of the application. This integrated circuit product may be installed in the data processing system 300.

The embodiments of the application described above are intended to be examples only. Those skilled in the art will understand that various modifications of detail may be made to these embodiments, all of which come within the scope of the application.

What is claimed is:

1. A method for generating an AI-based building energy model for a client building, comprising:
   using a processor, generating an energy profile database by:
      defining a set of building parameters including one or more of building types, climate zone specifications, and building envelope parameters including one or more of window-to-wall ratios, R-values, and U-factors;
      generating energy profiles by simulating a set of physical building models corresponding to the set of building parameters; and,
      populating the energy profile database with the energy profiles;
   determining an energy profile for the client building by:
      splitting the energy profile database into parameter-based groups and clustering each parameter-based group into a set of clusters, each cluster having a representative pattern, the energy profiles belonging to each cluster being sorted based on their proximity to the representative pattern;
      selecting a cluster from the set of clusters; and,
      selecting the energy profile in the cluster that is a closest match to that of the client building using the respective representative pattern for the cluster;
   selecting a physical building model from a building model database that corresponds to the energy profile for the client building;
   calibrating the physical building model using known energy data and metadata for the client building to generate an adjusted building model for the client building;
   generating a set of training datasets from the adjusted building model and inputting the set of training datasets into an artificial intelligence module to generate the AI-based building energy model; and,
   generating at least one control strategy from the AI-based building energy model.

2. The method of claim 1, wherein the calibrating is performed manually using a graphical user interface ("GUI").

3. The method of claim 1, further comprising aggregating observed operational building data for the client building into an observed dataset for the client building and combining the observed dataset with the set of training datasets to thereby reduce error of the artificial intelligence module when generating the AI-based building energy model.

4. The method of claim 1, wherein the at least one control strategy leverages rapid energy-prediction capabilities of the AI-based building energy model.

5. The method of claim 1, further comprising transmitting the at least one control strategy to the client building to control operations thereof.

6. The method of claim 5, wherein the at least one control strategy includes at least one control signal.

7. The method of claim 1, wherein the processor is at least one processor running within one or more of a building energy modeling system, a predictive building control system, a building energy management system, a utility demand response control system, a control system, a supervisory control and data acquisition ("SCADA") system, and an energy management system ("EMS").

8. A system for generating an AI-based building energy model for a client building, comprising:
   a processor coupled to memory; and,
   at least one of hardware and software modules within the memory and controlled or executed by the processor, the modules including:
   a module for generating an energy profile database by:
      defining a set of building parameters including one or more of building types, climate zone specifications, and building envelope parameters including one or more of window-to-wall ratios, R-values, and U-factors;
      generating energy profiles by simulating a set of physical building models corresponding to the set of building parameters; and,
      populating the energy profile database with the energy profiles;
   a module for determining an energy profile for the client building by:
      splitting the energy profile database into parameter-based groups and clustering each parameter-based group into a set of clusters, each cluster having a representative pattern, the energy profiles belonging to each cluster being sorted based on their proximity to the representative pattern;
      selecting a cluster from the set of clusters; and,
      selecting the energy profile in the cluster that is a closest match to that of the client building using the respective representative pattern for the cluster;

a module for selecting a physical building model from a building model database that corresponds to the energy profile for the client building;

a module for calibrating the physical building model using known energy data and metadata for the client building to generate an adjusted building model for the client building;

a module for generating a set of training datasets from the adjusted building model and inputting the set of training datasets into an artificial intelligence module to generate the AI-based building energy model; and, a module for generating at least one control strategy from the AI-based building energy model.

9. The system of claim 8, wherein the calibrating is performed manually using a graphical user interface ("GUI").

10. The system of claim 8, further comprising a module for aggregating observed operational building data for the client building into an observed dataset for the client building and combining the observed dataset with the set of training datasets to thereby reduce error of the artificial intelligence module when generating the AI-based building energy model.

11. The system of claim 8, wherein the at least one control strategy leverages rapid energy-prediction capabilities of the AI-based building energy model.

12. The system of claim 8, further comprising a module for transmitting the at least one control strategy to the client building to control operations thereof.

13. The system of claim 12, wherein the at least one control strategy includes at least one control signal.

14. The system of claim 8, wherein the system is one or more of a building energy modeling system, a predictive building control system, a building energy management system, a utility demand response control system, a control system, a supervisory control and data acquisition ("SCADA") system, and an energy management system ("EMS").

15. A system for generating an AI-based building energy model for a client building, comprising:

a building analytics system, coupled to the system, for generating an energy profile database, the building analytics system including a respective processor coupled to respective memory and at least one of respective hardware and software modules within the respective memory and controlled or executed by the respective processor for:

defining a set of building parameters including one or more of building types, climate zone specifications, and building envelope parameters including one or more of window-to-wall ratios, R-values, and U-factors;

generating energy profiles by simulating a set of physical building models corresponding to the set of building parameters; and, populating the energy profile database with the energy profiles;

an energy profile database and clustering system, coupled to the system, the energy profile database and clustering system including a respective processor coupled to respective memory and at least one of respective hardware and software modules within the respective memory and controlled or executed by the respective processor for:

determining an energy profile for the client building by: splitting the energy profile database into parameter-based groups and clustering each parameter-based group into a set of clusters, each cluster having a representative pattern, the energy profiles belonging to each cluster being sorted based on their proximity to the representative pattern; selecting a cluster from the set of clusters; and, selecting the energy profile in the cluster that is a closest match to that of the client building using the respective representative pattern for the cluster;

a processor coupled to memory; and, at least one of hardware and software modules within the memory and controlled or executed by the processor, the modules including:

a module for selecting a physical building model from a building model database that corresponds to the energy profile for the client building;

a module for calibrating the physical building model using known energy data and metadata for the client building to generate an adjusted building model for the client building;

a module for generating a set of training datasets from the adjusted building model and inputting the set of training datasets into an artificial intelligence module to generate the AI-based building energy model; and, a module for generating at least one control strategy from the AI-based building energy model.

\* \* \* \* \*